United States Patent
Busson et al.

(10) Patent No.: US 6,824,747 B2
(45) Date of Patent: Nov. 30, 2004

(54) DEVICE FOR CONNECTING A PIPE THAT IS INTENDED FOR HEATING/OR COOLING A PRESSURIZED REACTOR AND SAID REACTOR

(75) Inventors: Christian Busson, Charbonniere (FR); Eric Lenglet, Sainte Foy les Lyons (FR); Luc Nougier, Sainte Foy les Lyons (FR); Jacques Alagy, Charbonniere (FR); Michel Cohen, Antibes (FR); Jean Luc Le Peutrec, Roquefort les Pains (FR)

(73) Assignee: Institut Francais du Petrole, Cedex (FR)

( * ) Notice: Subject to any disclaimer, the term of this patent is extended or adjusted under 35 U.S.C. 154(b) by 916 days.

(21) Appl. No.: 09/730,794

(22) Filed: Dec. 7, 2000

(65) Prior Publication Data

US 2001/0032717 A1 Oct. 25, 2001

(30) Foreign Application Priority Data

Dec. 8, 1999 (FR) .......................................... 99 15497

(51) Int. Cl.⁷ .............................................. F28D 7/00
(52) U.S. Cl. ..................................... 422/198; 422/200
(58) Field of Search ............................... 422/198, 200, 422/201, 208

(56) References Cited

U.S. PATENT DOCUMENTS 4,234,543 A * 11/1980 Matovich .................... 422/109
4,645,633 A * 2/1987 Hattori ........................ 376/179
4,714,592 A * 12/1987 Zanma et al. ................ 422/192
4,989,669 A * 2/1991 Barnes .................... 165/104.16
5,508,007 A * 4/1996 Vidal et al. .................. 422/141
5,515,914 A 5/1996 Lashbrook, Jr. et al.
5,554,347 A 9/1996 Busson et al.
6,013,158 A * 1/2000 Wootten ....................... 202/99

FOREIGN PATENT DOCUMENTS

| DE | 2348009 | 3/1975 |
| EP | 0393221 A1 | 10/1990 |
| EP | 0666104 A1 | 9/1995 |

* cited by examiner

Primary Examiner—M. Alexandra Elve
(74) Attorney, Agent, or Firm—Millen, White, Zelano & Branigan, P.C.

(57) ABSTRACT

Device for connecting a heat exchange pipe (4), whereby said pipe (4) is positioned between walls (11) that are located on both sides of pipe (4), intended for heating and/or cooling a reactor, whose internal pressure is considerably higher than the atmospheric pressure and than the pressure that prevails inside said pipe (4), and said reactor, whereby said device comprises a series of cooperating means that comprise: means for connecting this pipe (4) and jacket (2a) of said reactor, whereby said means comprise a packing box (21, 22, 23), a flange (28) that is attached to jacket (2a) of the reactor by means of a joint (18), a bellows (25) that is placed between packing box (21, 22, 23) and said flange (28) to ensure a relatively flexible connection between pipe (4) and jacket (2a) of the reactor.

Figure 3:
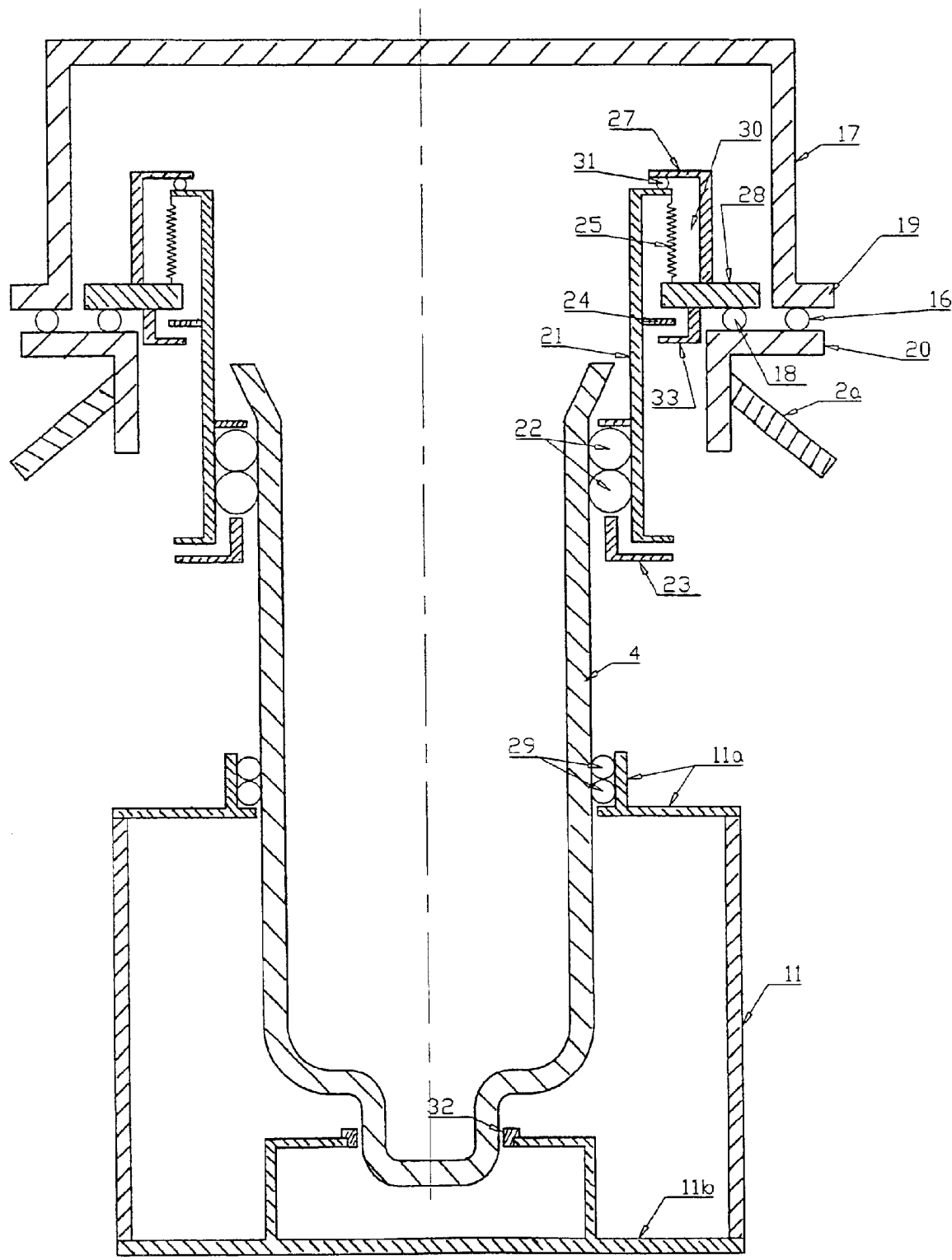

FIG. 3 to be published.

30 Claims, 6 Drawing Sheets

DEVICE FOR CONNECTING A PIPE THAT IS INTENDED FOR HEATING/OR COOLING A PRESSURIZED REACTOR AND SAID REACTOR

This invention relates to a device for connecting a heat exchange pipe, which is most often a radiant pipe that is intended for heating a pressurized reactor, and said reactor. The reactor that is described, for example, in U.S. Pat. No. 5,554,347 of the applicant usually comprises, in the case where chemical reactions are carried out that require at least at start-up an input of calories, a series of elements that make possible at least in a first zone a supply of heat that is necessary to the start-up of the reaction. The teaching of this patent is to be considered as an integrating part of this description solely from the fact of its citation. This reactor can be used for reactions that are exothermic overall but that require the input of calories at the start-up, such as, for example, the catalytic hydrogenation reactions. This reactor is more particularly applicable to the implementation of any endothermic reaction but more particularly for the implementation of reactions of steam-cracking, pyrolysis, catalytic dehydrogenation and catalytic vaporeforming of hydrocarbons or hydrocarbon fractions in which the reaction temperature is most often higher than about 350° C. and where one of the problems to be solved is to limit the secondary reactions that lead to the formation of tar and/or coke.

The walls play an important role in heat exchange, since they can absorb the radiation that is emitted by the jackets of the heat exchange means, and consequently the temperatures of these jackets and walls have a tendency to attain equilibrium. It is then possible to increase in particular the exchange surface and virtually to double it by designing the device in a special way. Actually, although the heat exchange means can be placed at random, it is preferable, for the purpose of increasing the exchange surface, to place these heat exchange means so that they are aligned, which makes it possible to produce n rows of m heat exchange means in terms of the length (for a total number of heat exchange means equal to (n×m), thus at least one longitudinal zone and most often at least two longitudinal zones that each comprise at least one and often several layers of heat exchange means will be formed, whereby each longitudinal zone is separated from the next by a wall that is made of a refractory material. It thus is possible to increase the heat exchange surface by an optimized surface such as, for example, by the addition of flanges on the outside jackets of the heat exchange means that take part in the heat transfer.

By radiation, the temperature of these walls increases and has the tendency to reach a value that is very close to that of the outside jackets of the heat exchange means. These walls therefore will also play a role in the heating of the process gas by convection. Thus, in this embodiment, whereby the exchange surface is significantly increased, it will be possible to obtain the same process gas temperature with a temperature of the outside jackets of the heat exchange means and walls of a relatively smaller thickness, which consequently makes possible a reduction of the coke formation. In a particular embodiment that is described in, for example, U.S. Pat. No. 5,554,347, each longitudinal zone will comprise a single row of heat exchange means.

According to these two embodiments, the convective exchanges between the process gas and the walls are to a large extent increased and they can also be improved by imposing significant speed on the process gas and by creating turbulence zones. The increase of the speed of the process gas can be obtained by, for example, using walls whose shape promotes this increase of speed and the appearance of turbulence zones. Walls of special shape are shown as nonlimiting examples in FIG. 1, which corresponds to the diagrammatic representation of FIG. 1B of U.S. Pat. No. 5,554,347.

According to the description of U.S. Pat. No. 5,554,347, the walls are usually made of refractory material. Any refractory material and in particular the ceramic materials can be used to produce the walls. It is possible to cite, as nonlimiting examples, zirconia, silicon carbide, mullite and various refractory concretes.

Figure 1:
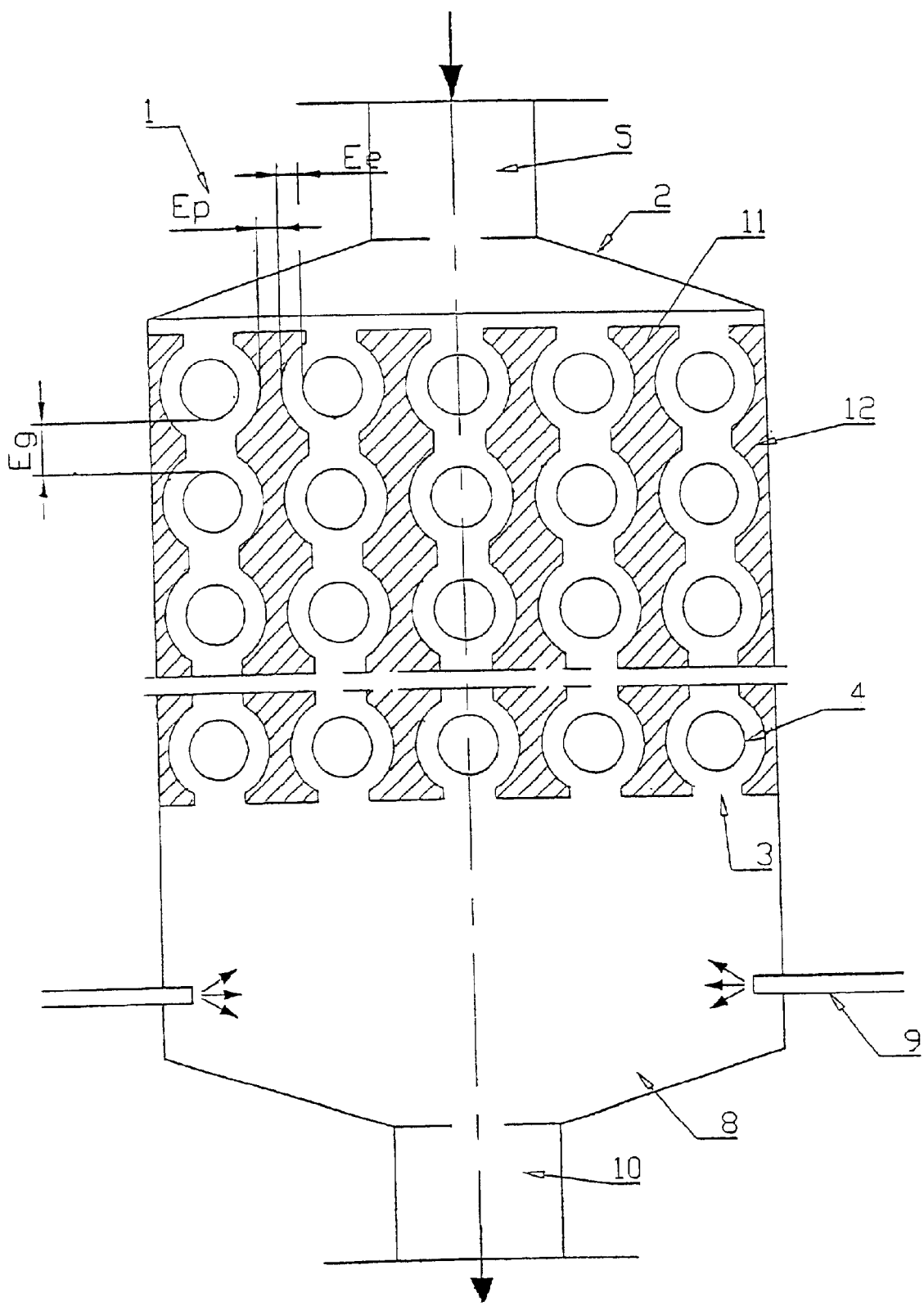

According to an embodiment that corresponds to one of those described in U.S. Pat. No. 5,554,347, FIG. 1 showed a vertical reactor (1) of elongated shape and rectangular section that comprises a distributor (2) that makes it possible to supply reaction gas mixture to said reactor via an inlet port (5). This reactor comprises heat exchange means (3) that each comprise an outside jacket (4) and that are placed in rows of approximately parallel layers and that form in a plane (plane of the figure) a bundle with a square pitch. These layers define transversal heating or cooling sections that are approximately perpendicular to the axis of the reactor that is defined in the direction of flow of the reaction gas mixture. These rows are separated from one another by walls (11) that are advantageously made of ceramic and are approximately parallel to the axis of the reactor. These walls (11) have a shape that is suitable for creating turbulence and that comprises cavities at each heat exchange means (3). On the inside face of its outside walls, this reactor comprises a projecting part (12), advantageously made of ceramic material, that has a shape that is suitable for creating turbulence, that comprises cavities at each heat exchange means (3). Distance Eg that separates two adjacent heat exchange means (3) is not very critical, but remains small enough, however, to ensure questions of dwell time and density of thermal flow. It is usually from about 2 mm to about 100 mm. The rows of heat exchange means (3) are separated by a wall, for example, made of refractory concrete with a based electromolten alumina. Distance Ee between heat exchange means (3) and the walls or dimension of passages is usually small enough to ensure a good contact of the reaction gas mixture with the outside surface of jacket (4) of heat exchange means (3). It is usually from about 1 mm to about 100 mm and preferably from about 2 mm to about 50 mm. In their thinnest part, the walls have a thickness Ep that is relatively small but sufficient to ensure a good mechanical behavior of these walls. It is usually from about 2 mm to about 300 mm and preferably from about 5 mm to about 50 mm. At the outlet of the heating zone, the effluents of the reaction are cooled in a cooling zone (8). They are brought into contact with a quenching agent introduced via injectors (9) placed along the periphery of reactor (1) and connected to an outside source, not shown, of said quenching agent. All of the effluent gases are cooled, then collected via an orifice (10) at the end of reactor (1).

The reactions that are used in this type of reactor are usually carried out under a pressure that is higher than the atmospheric pressure and that is often from about 0.01 bar (1 bar is equal to 0.1 MPa) to about 30 bar and most often between 0.5 bar to about 10 bar. The necessity of working under pressure imposes the use of a sealed connecting device between pipe (4) and the element for attaching said pipe to reactor (1).

The description of U.S. Pat. No. 5,554,347 explained in column 12, lines 21 to 24 in connection with the description of FIG. 2 that is attached to this patent the presence of a seal.

Figure 2:
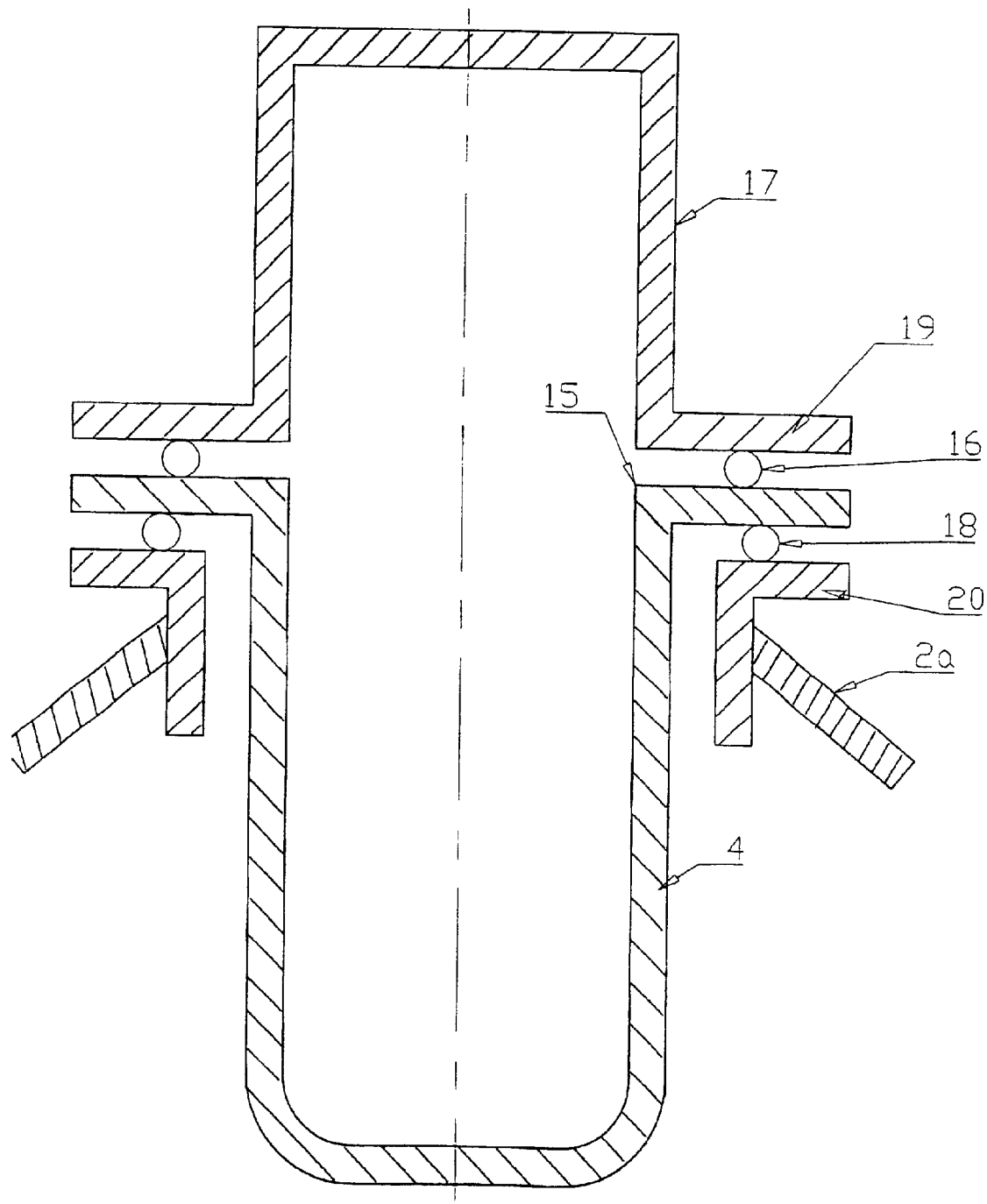

To illustrate simply and more diagrammatically the production of the teaching according to this patent, FIG. 2, attached to this description, showed jacket (2a) of the reactor that comprises a flange (20) that supports flange (15) that in its upper part ends pipe (4). The sealing is done by crushing joint (18). This sealing means is installed to prevent leakage toward the outside of the reactor but also leakage that comes from the inside of the reactor toward the inside of pipe (4). According to the description of U.S. Pat. No. 5,554,347, pipe (4) is a radiant pipe on top of which is a burner that is shown in FIG. 2, attached to this description, by its upper part (17) and that comprises a flange (19) that is connected to flange (15) of radiant pipe (4) via a joint (16).

By this method of assembly, pipe (4) is attached in a sealed manner to the reactor via flange (20). Under these conditions, however, this attachment is rigid.

In many cases of use and more particularly in reactors for pyrolysis of chemical molecules, the radiant pipes can be brought to temperatures that are equal to or greater than about 800° C. and often equal to or greater than 1000° C. and can even reach temperatures as high as 1500° C.

Under these rigorous conditions, the connecting device that is usually used and that is part of the prior art known to one skilled in the art and shown diagrammatically in FIG. 2 attached to this description is subjected to relative movements between jacket (2a) of the reactor and walls (11) or (11) and (12) (not shown in this FIG. 2 but shown in FIG. 1, located on both sides of pipe (4) and unable to ensure a satisfactory sealing, which is reflected by the leaks that cause the loss of a portion of the reagents used in the reactor which most often causes a reduction of output and/or of selectivity. In addition, these leaks pose safety problems. In some cases, pipe (4) is offset, and this can even cause it to rupture.

One of the objects of this invention is to eliminate the drawbacks described above. The goals that are proposed to be reached and that correspond to problems raised by the techniques that are known and described in the prior art are to propose a preferably sealed connecting system between a pipe that is intended for heating and/or for cooling, which is most often a radiant pipe that is intended for heating a pressurized reactor and said reactor.

The object of this invention relates to a device for connecting a heat exchange pipe (4) that is inserted in a reactor, and said reactor, whereby said pipe (4) is positioned between walls (11) or (11) and (12) located on both sides of pipe (4), intended for heating and/or cooling said reactor, whose internal pressure is considerably higher than the atmospheric pressure and than the pressure that prevails inside said pipe (4), whereby said device is characterized in that it comprises a series of cooperating means that comprise preferably essentially sealed connecting means between this pipe (4) and jacket (2a) of said reactor, whereby said means comprise a packing box (21, 22, 23), a flange (28) that is attached to jacket (2a) of the reactor by means of a joint (18), a bellows or an expansion joint (25) that is connected on one side to said packing box (21, 22, 23) and on the other side to said flange (28), whereby said connection allows small-amplitude axial movements and radial movements.

According to a frequent embodiment of the device of this invention, packing box (21, 22, 23) comprises an intermediate stop (24) to take up the stresses exerted on the means that are installed to limit the axial movements while allowing small-amplitude radial movements of entire pipe (4) and of said packing box (21, 22, 23) that works with said flange (28) and/or with bracket (33) that is integral with said flange (28) that is attached to flange (20) that is connected to jacket (2a) of the reactor.

According to a particular and preferred embodiment of the invention, the device for connecting pipe (4) and said reactor will comprise at least one means for guiding pipe (4) relative to walls (11) or (11) and (12) that are located on both sides of pipe (4).

Most often, pipe (4) is a radiant pipe (whose internal pressure is usually approximately equal to the atmospheric pressure) that is intended for heating a pressurized reactor (i.e., whose internal pressure is considerably higher than the atmospheric pressure), and said reactor is usually used to carry out chemical reactions.

The connecting device according to the invention is particularly well suited to the case where pipe (4) is a pipe that consists of refractory material, such as, for example, a ceramic material that extends between walls (11) or (11) and (12) that are located on both sides of pipe (4) and that themselves consist of refractory material, such as, for example, a ceramic material.

Said pipe (4) is connected or attached to the metallic jacket of a reactor that is used to carry out chemical reactions. According to a preferred embodiment, the device of the invention is particularly well suited to the case where pipe (4) and walls (11) and (12) consist of ceramic material and, for example, zirconia or silicon carbide, wherein this last material is the one that is preferably used. This device is used more particularly in the case where the reactor is a reactor for catalytic hydrogenation, steam-cracking, pyrolysis, catalytic dehydrogenation and catalytic vapore-forming of hydrocarbons or hydrocarbon fractions in which the reaction temperature is most often higher than about 350° C. and can reach values as high as 1500° C., as mentioned above. The pyrolysis reactions that can be used in the reactor are, for example, reactions of hydrocarbon pyrolysis, hydrogen sulfide pyrolysis and ammonia pyrolysis.

According to a special preferred embodiment of the invention, the axis of pipe (4) is kept approximately perpendicular to the axis of the reactor, i.e., the direction of flow of the reaction gas mixture. This holding is usually carried out with at least one guiding means that most often comprises at least one bearing that is usually located in the upper portion of pipe (4). According to another embodiment, at least two bearings are used, one of which is located in the upper portion of pipe (4) and at least one other of which is located in the lower portion of pipe (4). Pipe (4) can have an essentially constant section over its entire height or can comprise a restricted section in its lower portion such that its diameter is then from about 10% to about 99%, often from about 20% to about 80%, and most often from about 40% to about 60% of the diameter of said pipe above said restriction. When this restricted section exists, its height is about 0.05× to about 2×, often from 0.1× to about 1×, and most often from about 0.25× to about 0.75× the diameter of said pipe above said restriction. This height can be, for example, on the order of 100 millimeters.

According to another particular embodiment of the invention, means that are usually mechanical means (27) that make it possible to protect bellows (25) from a pressure variation that can be a sudden pressure variation usually coming from the inside of pipe (4). A preferred embodiment of this particular form consists in creating a chamber (30) on the side of bellows (25) that is linked to the inside of pipe (4), whereby this linking is usually established through a restricted passage between chamber (30) and the inside of pipe (4) that most often comprises a generally non-sealed joint (31).

In the type of reactor (1) that is described above and as depicted grammatically in a nonlimiting way in FIG. 1, pipe (4) should be centered relative to walls (11) or (11) and (12) located on both sides of said pipe, which can be carried out with one or more bearing(s) that thus make it possible to carry out axial and radial movements that usually have a relatively limited amplitude.

The invention will be better understood by the description of several embodiments, given by way of pure illustration but not at all limiting that will be done below with FIGS. 3 to 6 that are attached to this description and in which similar elements are referred to by the same reference numbers and letters. These figures each relate to a particular embodiment of the connecting system according to the invention between a pipe (4) and jacket (2a) of a reactor that comprises walls (11) or (11) and (12) (the figures showed a pipe (4) located inside the reactor between two walls 11) that are located on both sides of pipe (4). These diagrammatic representations relate to the preferred case of an embodiment of the invention comprising a reactor that comprises a system for heating pipe (4) that is then a radiant pipe whose heat is provided by a burner that comprises a jacket (17) that is connected in an essentially sealed manner to jacket (2a) of the reactor, ensuring the confinement of the bellows or expansion joint (25) relative to the outside of said reactor. Jacket (17) comprises a connecting means (19) with jacket (2a) of the reactor via flange (20). A joint (16) is interposed between said connecting means (19) and flange (20).

FIG. 3 shows a first embodiment of the connecting system of pipe (4) to jacket (2a) of a reactor. The essentially sealed connecting means between this radiant pipe (4) and jacket (2a) of said reactor comprise a packing box (21, 22, 23), a flange (28) that is attached to jacket (2a) of the reactor via a flange (20) and a joint (18). A bellows or expansion joint (25) is placed between packing box (21, 22, 23) and flange (28) that is connected to a bracket (27) to ensure a relatively flexible connection between pipe (4) and flange (20) that is connected to jacket (2a) of the reactor. This bellows or expansion joint (25) is thus located above flange (28) in axial position relative to the axis of pipe (4). Packing box (21, 22, 23) comprises an inking element of the bellows and an intermediate stop (24) to take up the stresses exerted on the means that are installed to limit the axial movements while allowing small-amplitude radial movements of entire pipe (4) and of said packing box. Said intermediate stop works with flange (28) and/or with bracket (33) that is integral with said flange (28) that is attached to flange (20) that is connected to jacket (2a) of the reactor. The connection between bracket (27) and packing box (21, 22, 23) comprises a non-sealed joint (31) that defines a restricted section between these two elements allowing, if necessary, the passage of a gas mixture that is contained in radiant pipe (4), in particular in the case of sudden pressure variation inside pipe (4), to chamber (30). This non-sealed connection between pipe (4) and chamber (30) on the side of bellows (25) that is linked to the inside of pipe (4) ensures a protection of said bellows during a sudden pressure variation in pipe (4) that can occur, for example, when a gas burner is used, and an explosion of the gas mixture that is used for heating by combustion occurs. Flange (28) comprises a bracket (33) that forms a recess for bearing (24) of packing box (21, 22, 23) whose function is to limit the axial movement of said packing box. In its upper portion, pipe (4) comprises a guiding means relative to walls (11) or (11) and (12) (only walls 11 are shown in FIG. 3), located on both sides of pipe (4), formed by a cornerstone that comprises a recess that is intended to accommodate at least one bearing (29) between said pipe (4) and said cornerstone (11a). This pipe (4) also comprises, in its lower portion, at the restricted section, a guiding means relative to walls (11) or (11) and (12) (only walls 11 are shown in FIG. 3), located on both sides of pipe (4) that is formed by a bed plate (11b) that comprises a recess that is intended to accommodate bearing (32) between said pipe (4) and said bed plate (11b). Walls (11) or (12) are connected in an essentially sealed manner in their upper portion to cornerstone (11a) that comprises a recess for bearing (29), and in their lower portion a bed plate (11b) that usually consists of refractory material and often ceramic material connects in an essentially sealed manner two walls (11) that are located on both sides of a pipe (4) or a wall (11) and a wall (12) that are located on both sides of a pipe (4). The scope of this invention would not be exceeded by using a bed plate (11b) that continuously connects in an essentially sealed manner all of walls (11) and (12) of the reactor. According to this embodiment, the pressure that prevails in the reactor is exerted on the inside wall of the bellows.

Figure 4:
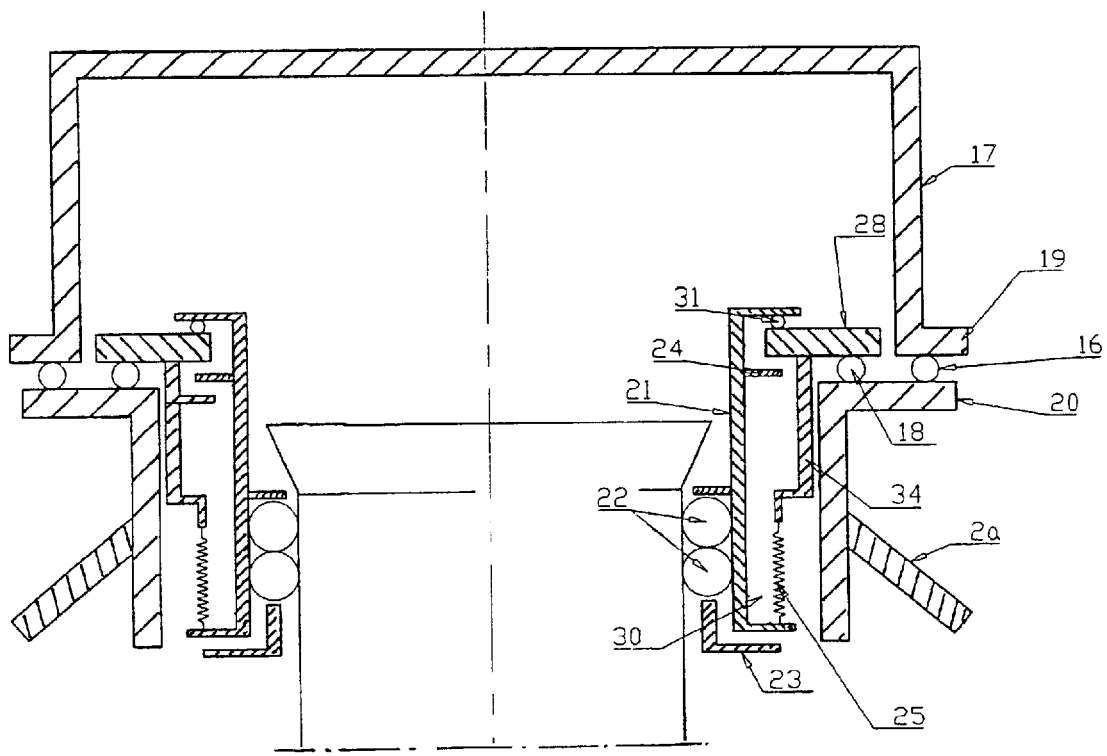

FIG. 4 represents an embodiment of the invention according to which the only differences relative to the embodiment that is shown in FIG. 3 reside in the changed location of bellows (25) and of chamber (30), and under these conditions, the pressure of the reactor is exerted on the outside wall of the bellows. According to this embodiment, bellows (25) is placed below flange (28) between a bracket (34) that is connected to flange (28) and packing box (21, 22, 23). Thus, according to this embodiment, this bellows (25) is located below flange (28) in axial position relative to the axis of pipe (4). Packing box (21, 22, 23) is directly connected to flange (28) by a non-sealed joint (31) that defines a restricted section between said packing box and said flange and makes possible, if necessary, the passage of a gas mixture that is contained in radiant pipe (4), in particular in the case of a sudden pressure variation inside pipe (4) to chamber (3).

Figure 5:
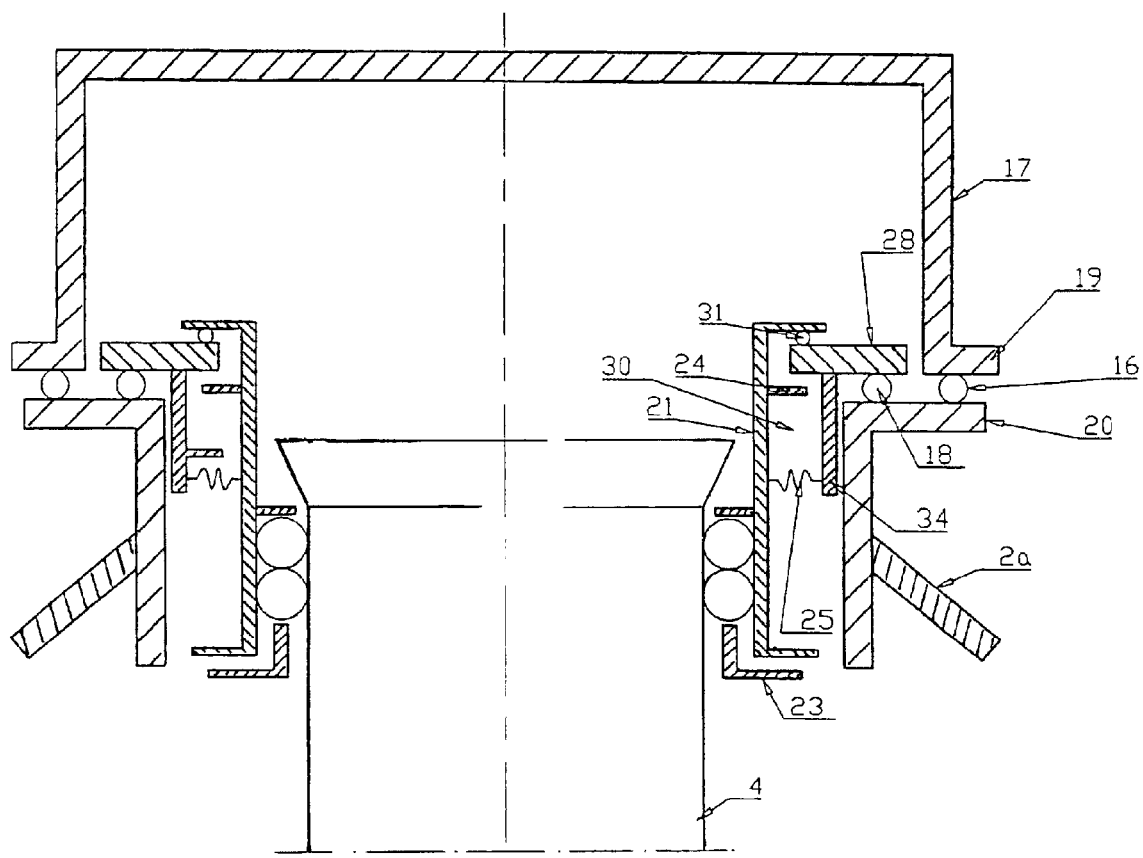

FIG. 5 depicts an embodiment of the invention, according to which the sole difference relative to the embodiment that is shown in FIG. 3 primarily resides in the use of a horizontal bellows that is best suited for compensating radial movements while allowing limited axial movements. As in the case shown in FIG. 4, bellows (25) is placed below flange (28) between a bracket (34) that is connected to flange (28) and packing box (21, 22, 23) and under these conditions, taking into account the location of chamber (30), the pressure of the reactor is exerted on the outside wall of the bellows. In the embodiment that is depicted in this FIG. 5, bellows (25) is located below flange (28) in a radial position relative to the axis of pipe (4). Although this is not shown by a specific figure, the scope of this invention would not be exceeded by positioning bellows (25) above flange (28) in radial position relative to the axis of pipe (4).

Figure 6:
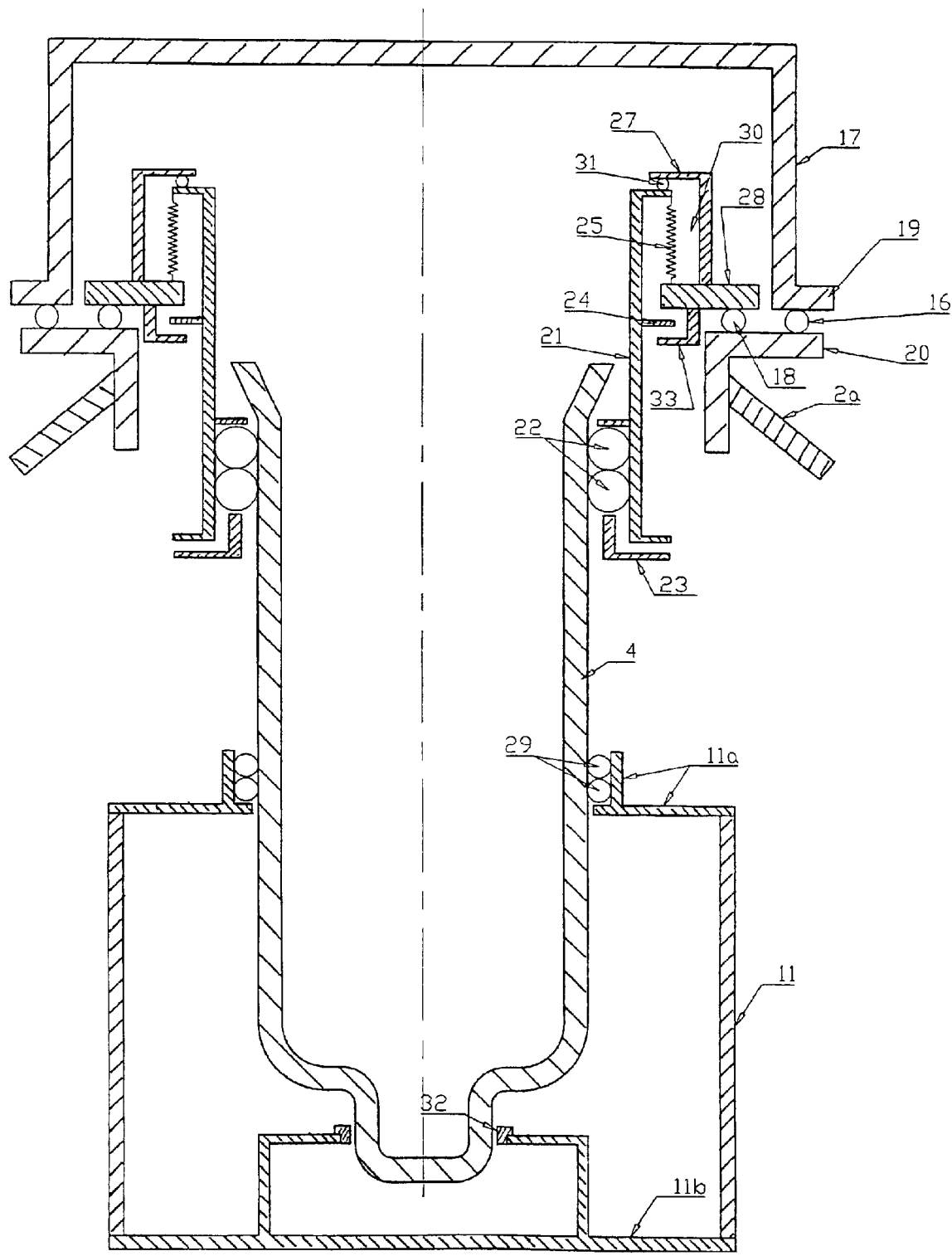

FIG. 6 depicts an embodiment of the invention according to which the sole difference relative to the embodiment that is shown in FIG. 3 is that radiant pipe (4) does not comprise the restricted section. Bed plate (11b) that comprises a recess that is intended to accommodate a bearing (32) between said pipe (4) and said bearing is positioned in the lower portion of radiant pipe (4).

What is claimed is:

1. Device for connecting a heat exchange pipe (4) that is inserted in a reactor, and said reactor, whereby said pipe (4) is positioned between walls (11) or (11) and (12) that are located on both sides of pipe (4), intended for heating and/or cooling said reactor, whose internal pressure is considerably higher than the atmospheric pressure and than the pressure that prevails inside said pipe (4), whereby said device is characterized in that it comprises a series of cooperating means that comprise connecting means between this pipe (4) and jacket (2a) of said reactor, whereby said means comprise a packing box (21, 22, 23), a flange (28) that is attached to jacket (2a) of the reactor by means of a joint (18), a bellows or an expansion joint (25) that is connected on one side to said packing box (21, 22, 23) and on the other side to said flange (28), whereby said connection allows small-amplitude axial movements and radial movements.

2. Device according to claim 1, wherein said packing box (21, 22, 23) comprises an intermediate stop (24) to take up the stresses exerted on the means that are installed to limit the axial movements while allowing small-amplitude radial movements of entire pipe (4) and of said packing box (21, 22, 23) that work with said flange (28) and/or with bracket (33) that is integral with said flange (28) that is attached to flange (20) that is connected to jacket (2a) of the reactor.

3. Device according to claim 2, wherein it comprises at least one means for guiding pipe (4) relative to walls (11) or (11) and (12) that are located on both sides of pipe (4).

4. Device according to claim 3, wherein the guiding means is located in the upper portion of pipe (4).

5. Device according to claim 2, wherein it comprises at least two guiding means of pipe (4).

6. Device according to claim 5, wherein at least one guiding means is located in the upper portion of pipe (4) and at least one other guiding means is located in the lower portion of pipe (4).

7. Device according to claim 6, wherein the guiding means that is located in the upper portion of pipe (4) comprises a recess that is intended to accommodate at least one bearing (29).

8. Device according to claim 7, wherein it comprises mechanical means that make it possible to protect bellows (25) from a pressure variation.

9. Device according to claim 8, wherein the mechanical means that make it possible to protect bellows (25) from a pressure variation comprises a chamber (30) on the side of bellows (25) that is linked to the inside of pipe (4).

10. Device according to claim 9, wherein the mechanical means that make it possible to protect bellows (25) from a pressure variation comprise a linking that is established through a restricted passage between chamber (30) and the inside of pipe (4).

11. Device according to claim 10, wherein the mechanical means that make it possible to protect bellows (25) from a pressure variation comprise a linking that is established through a restricted passage between chamber (30) and the inside of pipe (4) that comprises a joint (31).

12. Device according to claim 11, wherein the reactor comprises a system for heating pipe (4) that is a radiant pipe that is fed via a burner comprising a jacket (17) that is connected in an essentially sealed manner to jacket (2a) of the reactor, ensuring the confinement of bellows (25) relative to the outside of said reactor.

13. Device according to claim 12, wherein bellows (25) is located above flange (28) in axial position relative to the axis of pipe (4).

14. Device according to claim 12, wherein bellows (25) is located below flange (28) in axial position relative to the axis of pipe (4).

15. Device according to claim 12, wherein bellows (25) is located above or below flange (28) in radial position relative to the axis of pipe (4).

16. Device according to claim 15, wherein in its lower portion, pipe (4) comprises a restricted section such that its diameter is then from about 10% to about 99% of the diameter of said pipe above said restriction.

17. Device according to claim 16, wherein the height of the restricted section of pipe (4) is from about 0.05× to about twice the diameter of said tube above said restriction.

18. Device according to claim 17, wherein pipe (4) is a pipe that consists of ceramic material, and walls (11) and (12) are made of refractory material.

19. Device according to claims 18, wherein pipe (4) and walls (11) and (12) are made of zirconia or silicon carbide and preferably silicon carbide.

20. Device according to claim 1, wherein it comprises at least one means for guiding pipe (4) relative to walls (11) or (11) and (12) that are located on both sides of pipe (4).

21. Device according to claim 1, wherein it comprises at least two guiding means of pipe (4).

22. Device according to claim 3, wherein the guiding means that is located in the upper portion of pipe (4) comprises a recess that is intended to accommodate at least one bearing (29).

23. Device according to claim 1, wherein it comprises mechanical means that make it possible to protect bellows (25) from a pressure variation.

24. Device according to claim 1, wherein the reactor comprises a system for heating pipe (4) that is a radiant pipe that is fed via a burner comprising a jacket (17) that is connected in an essentially sealed manner to jacket (2a) of the reactor, ensuring the confinement of bellows (25) relative to the outside of said reactor.

25. Device according to claim 1, wherein bellows (25) is located above flange (28) in axial position relative to the axis of pipe (4).

26. Device according to claim 1, wherein bellows (25) is located below flange (28) in axial position relative to the axis of pipe (4).

27. Device according to claim 1, wherein bellows (25) is located above or below flange (28) in radial position relative to the axis of pipe (4).

28. Device according to claim 1, wherein in its lower portion, pipe (4) comprises a restricted section such that its diameter is then from about 10% to about 99% of the diameter of said pipe above said restriction.

29. Device according to claim 1, wherein pipe (4) is a pipe that consists of ceramic material, and the walls (11) and (12) are made of refractory material.

30. Device according to claim 1, wherein pipe (4) and walls (11) and (12) are made of zirconia or silicon carbide and preferably silicon carbide.

* * * * *

UNITED STATES PATENT AND TRADEMARK OFFICE
CERTIFICATE OF CORRECTION

PATENT NO. : 6,824,747 B2
DATED : November 30, 2004
INVENTOR(S) : Busson et al.

It is certified that error appears in the above-identified patent and that said Letters Patent is hereby corrected as shown below:

Title page,
Item [54], after change "DEVICE FOR CONNECTING A PIPE THAT IS INTENDED FOR HEATING/OR COOLING A PRESSURIZED REACTOR AND SAID REACTOR" to -- DEVICE FOR CONNECTING A PIPE THAT IS INTENDED FOR HEATING AND/OR COOLING A PRESSURIZED REACTOR AND SAID REACTOR HEATING --.

Signed and Sealed this

Seventeenth Day of May, 2005

JON W. DUDAS
*Director of the United States Patent and Trademark Office*